(12) United States Patent
Karlsson (10) Patent No.: US 11,803,897 B2
(45) Date of Patent: *Oct. 31, 2023

(54) SYSTEMS AND METHODS FOR IMPROVED SORTING USING INTELLIGENT PARTITIONING AND TERMINATION

(71) Applicant: Verizon Media Inc., New York, NY (US)

(72) Inventor: Niklas Karlsson, Mountain View, CA (US)

(73) Assignee: Yahoo Ad Tech LLC, New York, NY (US)

( * ) Notice: Subject to any disclaimer, the term of this patent is extended or adjusted under 35 U.S.C. 154(b) by 630 days.

This patent is subject to a terminal disclaimer.

(21) Appl. No.: 16/448,949

(22) Filed: Jun. 21, 2019

(65) Prior Publication Data

US 2019/0311425 A1    Oct. 10, 2019

Related U.S. Application Data

(63) Continuation of application No. 13/765,312, filed on Feb. 12, 2013, now Pat. No. 10,380,678.

(51) Int. Cl.
*G06N 20/00* (2019.01)
*G06Q 30/08* (2012.01)
*G06F 16/22* (2019.01)

(52) U.S. Cl.
CPC ............. *G06Q 30/08* (2013.01); *G06F 16/22* (2019.01); *G06N 20/00* (2019.01)

(58) Field of Classification Search
CPC . G06N 20/00; G06N 3/08; G06N 3/04; G06F 17/30707; G06K 9/6269
(Continued)

(56) References Cited

U.S. PATENT DOCUMENTS 6,985,885 B1    1/2006  Goldberg
2004/0162817 A1  8/2004  Boskovic
(Continued)

OTHER PUBLICATIONS

Clémençon et al.—"Adaptive partitioning schemes for bipartite ranking How to grow and prune a ranking tree"—https://hal.archives-ouvertes.fr/hal-00416054/document (Year: 2009).*

(Continued)

*Primary Examiner* — Viker A Lamardo
(74) *Attorney, Agent, or Firm* — Bookoff McAndrews, PLLC (57) ABSTRACT

Systems and methods are disclosed for sorting elements, such as bids in an auction environment or marketplace for the display of an advertisement on a web page. According to one implementation, a plurality of elements may be received over a network. For example, the plurality of elements may comprise a plurality of bids, each of which may include, for example, a bid price, a bid allocation, and a bid target. The received set of elements may be recursively partitioned into a plurality of element subsets. For example, the element set may be partitioned about a pivot selected from a sample set of elements chosen from the element set. A subset of elements may be identified from the element set as eligible elements (e.g., bids eligible for selection as a winning bid). Once the set of eligible elements has been identified, the recursive partitioning of elements may be terminated.

14 Claims, 6 Drawing Sheets

(58) Field of Classification Search
USPC .......................................................... 706/20
See application file for complete search history.

(56) References Cited

U.S. PATENT DOCUMENTS

| | | | |
|---|---|---|---|
| 2008/0004962 A1 | 1/2008 | Muthukrishnan | |
| 2008/0052219 A1* | 2/2008 | Sandholm | G06Q 30/08 705/37 |
| 2009/0125907 A1* | 5/2009 | Wen | G06F 9/4843 718/101 |
| 2009/0177555 A1 | 7/2009 | Milgrom | |
| 2009/0177669 A1 | 7/2009 | Ramarao | |
| 2010/0198694 A1 | 8/2010 | Muthukrishnan | |
| 2010/0262499 A1* | 10/2010 | Karlsson | G06Q 30/0276 705/14.72 |
| 2011/0066518 A1* | 3/2011 | Mack | G06Q 30/08 705/26.3 |
| 2011/0251875 A1 | 10/2011 | Cosman | |
| 2012/0078821 A1 | 3/2012 | Ma | |
| 2013/0262525 A1 | 10/2013 | Burda | |

OTHER PUBLICATIONS

Raynor et al.—"The International Dictionary of Artificial Intelligence" (Year: 1999).*

Clémençon, et al., *Adaptive Partitioning Schemes for Bipartite Ranking How to Grow and Prune a Ranking Tree*—Apr. 1, 2011—Springer US—http://link.springer.com/article/10.1007%2Fs10994-101-5190-y.

Ghosh et al., *Bidding for Representative Allocations for Display Advertising* —2009—Springer Berlin Heidelberg—pp. 208-219—http://link.springer.com/chapter/10.100/9748-3-642-10841-9_20.

Karlsson, N., *Adaptive Partial Sorting Using FrugalQuicksort with Application in Display Advertising*, Advertising.com, v.3 (Jan. 26, 2013).

Raynor, W., The International Dictionary of Artificial Intelligence—1999—http://pdf.aminer.org/000/294/491/recognition_of_hand_printed_characters_via_induct_rdr.pdf.

* cited by examiner

SYSTEMS AND METHODS FOR IMPROVED SORTING USING INTELLIGENT PARTITIONING AND TERMINATION

CROSS-REFERENCE TO RELATED APPLICATION(S)

This patent application is a continuation of and claims the benefit of priority to U.S. Nonprovisional patent application Ser. No. 13/765,312, filed on Feb. 12, 2013, the entirety of which is incorporated herein by reference.

TECHNICAL FIELD

The present disclosure relates to systems and methods for improved sorting of elements, such as bids in an auction marketplace. More particularly, and without limitation, the present disclosure relates to computer-implemented systems and methods for sorting elements using adaptive partitioning of the elements and intelligent termination of the sorting.

BACKGROUND

A sorting algorithm is an algorithm that places elements of a list in a specified order. For example, a sorting algorithm may be applied to a list of numbers to place the numbers in numerical order or to a list of words to place the words in lexicographical order. Numerous sorting algorithms exist, such as, but not limited to Bubble Sort, Selection Sort, Merge Sort, and Quicksort. Each of these sorting algorithms has advantages and disadvantages relative to other sorting algorithms. For example, sorting algorithms may be classified according to their computational complexity, memory usage, stability, and adaptability, among other factors.

One of the more popular sorting algorithms in practice is Quicksort. Quicksort is classified as a divide-and-conquer algorithm. In other words, the Quicksort algorithm works by recursively breaking down a problem into two or more sub-problems, continuing further to break down the problems until they are much simpler to solve individually. The solutions to the sub-problems are then combined to achieve the solution for the original problem. The Quicksort algorithm, in particular, divides a set of data into subsets of data by performing a partition operation around a pivot. In this operation, all elements smaller (or lesser in value) than the pivot are placed in a first subset and all elements larger (or greater in value) than the pivot are placed in a second subset. Elements equal in value to the pivot may be placed in either the first or the second subset, according to the particular implementation of the algorithm. The first and second subsets are then similarly sorted in a recursive manner.

One application in which the Quicksort algorithm is often used is the market clearing aspect of a bidding system (e.g., an auction). Market clearing refers to the element of a bidding process by which bids are analyzed to determine a winning bid. Depending on the number of bids to be analyzed, the bidding process may require a large amount of resources to sort through and determine a winning bid. Thus, scalability is an important feature of an auction marketplace.

Although a conventional Quicksort algorithm may suit the needs of an auction marketplace that hosts a relatively large number of actors, such an algorithm may become prohibitively inefficient to use when the number of actors grows above a certain threshold. For example, auctions conducted over the Internet may involve numerous actors throughout the world. As the number of actors and bids increase, the computational overhead associated with the sorting of bids may become a bottleneck in the auction process.

SUMMARY

Consistent with the present disclosure, systems and methods are provided for more efficiently sorting elements. Embodiments consistent with the present disclosure include computer-implemented systems and methods for sorting elements using adaptive partitioning of the elements and intelligent termination of the sorting. This and other aspects of the disclosed embodiments may overcome one or more of the problems set forth above.

In accordance with one disclosed exemplary embodiment, a system is provided for sorting elements. The system includes a memory and a processor coupled to the memory. The processor is configured to receive a plurality of elements over a network. An element set may be formed from the received plurality of elements. The processor may recursively partition the element set into a plurality of element subsets. A set of eligible elements may be identified from the element set. Once the set of eligible elements has been identified, the processor may terminate the recursive partitioning of elements.

In accordance with another exemplary embodiment, a method is provided for sorting elements. According to the method, a plurality of elements may be received over a network. The plurality of elements may be used to form an element set. The element set may be recursively partitioned into a plurality of element subsets. A set of eligible elements may be identified from the element set. Once the set of eligible elements has been identified, the recursive partitioning of elements may be terminated.

According to still another exemplary embodiment, a computer readable medium is provided including instructions for sorting data. When executed, the instructions may cause a processor to perform steps to receive a plurality of elements over a network. The received plurality of elements may be used to form an element set. The instructions further may cause the processor to recursively partition the element set into a plurality of element subsets and identify a set of eligible elements from the element set. The instructions further may cause the processor to terminate the recursive partitioning of the elements once the set of eligible elements has been identified.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, a system described herein may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure may be implemented in various environments, including bidding or auction environments. Online advertising and content distribution are examples of environments that are often implemented using a bidding mechanism. In an exemplary ad distribution environment, an ad provider works both with (1) businesses who wish to advertise their products or services and (2) web sites/hosts that have space available for ad placement. The ad provider seeks to distribute ads submitted by the business to the various web sites in a manner that is most advantageous to all parties. For example, a web site may have several slots available for the display of advertisements. Businesses may bid against one another for the display of advertisements in these slots. The ad provider collects these bids, analyzes them according to various criteria (further detailed below), determines which ad should be displayed in each ad slot on a page, and distributes the winning ads to the available slots. Each instance of displaying an advertisement to a user viewing a web page may be referred to as an impression.

If bid price was the only parameter considered in the ad provider's selection of a winning bid, the same business may win too high a percentage of its requests for impressions upon first submitting its ads and bid prices for consideration. Accordingly, certain embodiments may utilize three parameters in determining a winning bid as part of the market clearing process: bid price, bid allocation, and bid target. A bid price may be any non-negative real number (i.e., $\mathbb{R}_{[0, \infty)}$). The bid price represents the price the bidder is willing to pay for the impression in the event the bidder wins the impression. A bid allocation may be any real number between (and including) 0 and 1 (i.e., $\mathbb{R}_{[0, 1]}$). The bid allocation may be used as a weighting factor, such that the bidder will be more likely to be awarded impressions in a more distributed fashion, reducing the likelihood that the bidder will either win all auctions and exhaust its budget or lose all auctions until all bidders with higher bid prices have exhausted their budgets. A bid target may be either 0 or 1 (i.e., $\{0,1\}$). In other words, the bid target is simply a binary value, in which 1 means that the bidder is eligible for an impression request and 0 means that the bidder is not eligible for the impression request.

Once all bidders interested in an impression (i.e., the bid set) have been identified, these parameters may be used to select a winning bidder, so that an appropriate ad may be displayed at the appropriate slot. In order to determine the winning bidder, a relatively small subset of bidders is first identified as likely candidates for the impression. This subset of bidders is further analyzed in a clearing process. Although several bid clearing mechanisms have been proposed, for purposes of illustration, the disclosed embodiments will be described in relation to the exemplary clearing mechanism used by the Advertising.com display advertising network for distribution of advertising by the AdLearn 5 campaign management system, as described in more detail below.

In accordance with certain disclosed embodiments, an eligible bidder is a bidder that is interested in an impression based on a specific web page and slot, as well as based on the user target. The user target may include factors such as a user's gender, age, interests, and behavior. For each impression request, the highest bidding subset of all eligible bidders is identified based on bid price, such that the sum of their bid allocations equals to at least one. As discussed above, a bid allocation may be a value between 0 and 1 submitted by a bidder along with its bid price to adjust the likelihood of an ad being selected for display in a given impression. The identified subset of eligible bidders may be called the final bid set. The sum of the bid allocations in the final bid set at this point may be called the raw allocation sum. The lowest (adjusted) bid price in the final bid set is the lowest eligible bid value. If the sum of bid allocations in the final bid set is greater than one, then the bid allocation of the lowest priced ad is trimmed to make the sum of the bid allocations equal to one. The ad to serve (i.e., the winning ad) is thereafter selected by a random draw wherein each specific ad is picked according to a probability commensurate to its bid allocation.

The bid price of the first bid that is not part of the final bid set is the highest ineligible bid value. If there are no bids that are not part of the final bid set (e.g., all bids are included in the final bid set), then the highest ineligible bid value is defined as 0.0 (zero). If the sum of the allocations in the final bid set is greater than 1.0, then the highest unsatisfied bid value equals the lowest eligible bid, otherwise it equals the highest ineligible bid value. To ensure that each impression request is certainly serviced with an ad, the ad provider may submit a bid from a house ad having a very small bid price but a bid allocation equal to one.

Using the above-described exemplary market clearing mechanism, an ordered final bid set and highest ineligible bid price may be identified for an impression request. The final bid set may comprise all bidders that have a non-zero probability of being awarded the impression in the bid clearing, while the highest ineligible bid may be the highest submitted bid price of bidders eligible for this impression request but with zero probability of being awarded the impression.

Overall, the process of selecting an ad for a particular impression may involve four steps: (1) bid sorting, (2) target filtering, (3) bid clearing, and (4) clearing price reporting. Traditionally, all bids are sorted before being filtered in regards to their target, as target filtering is computationally more expensive than sorting. Accordingly, by first sorting the bids, target filtering only needs to be done on so many bids as required to determine the final bid set and the highest ineligible bid price. During the sorting, it is unknown what bids will be rejected during the target filtering. Thus, it is necessary to sort all bids. As the ad network grows bigger, this excessive sorting may become prohibitively expensive. The disclosed embodiments address this problem by incorporating a sorting scheme that performs bid sorting and target filtering simultaneously, that intelligently partitions the data during the sorting process, and that terminates the sorting once the final bid set and the highest ineligible bid price have been determined. Accordingly, in accordance with certain embodiments of the present disclosure, the steps of (1) bid sorting and (2) target filtering are combined.

In order to sort the bids received from all businesses for a particular impression request, the ad provider may employ one or more sorting algorithms. One such algorithm that is commonly used to for this task is Quicksort. Quicksort is a recursive algorithm, which implements a three-step process to sort a subarray $A[p, \ldots, r]$: (1) divide, (2) conquer, and (3) combine. In the first step (i.e., divide), the array $A[p, \ldots, r]$ is partitioned into two nonempty subarrays $A[p, \ldots, q]$ and $A[q+1, \ldots, r]$, such that each element of $A[p, \ldots, q]$ is less than or equal to each element of $A[q+1, \ldots, r]$. The index q is computed as part of this partitioning procedure. In the second step (i.e., conquer), the two subarrays, $A[p, \ldots, q]$ and $A[q+1, \ldots, r]$, are sorted by recursive calls to Quicksort. After the original data step has been divided and conquered per steps one and two, the Quicksort algorithm reaches the third step (i.e., combine). Because the subarrays created in the first two steps are sorted in place, no work is needed to combine them. Thus, the entire array $A[p, \ldots, r]$ is now sorted.

Although Quicksort may be useful in numerous applications, the conventional Quicksort algorithm may introduce certain inefficiencies in certain applications, such as the market clearing process described above. In particular, according to the conventional Quicksort algorithm, sorting may continue until all elements in the original set have been sorted. However, the sorting of each and every element in a data set may be unnecessary. For example, in the market clearing process associated with selecting an ad for an impression, only a small subset of higher priced bids need be considered as candidates for the impression. Thus, eliminating the sorting of at least some bids (e.g., lower priced bids) may provide for the determination of the winning bid more rapidly and using fewer resources (e.g., memory).

The embodiments of the present disclosure provide improved sorting algorithms and features, including that referred to as FrugalQuicksort, which is also discussed in detail in Karlsson, N., *Adaptive Partial Sorting Using FrugalQuicksort with Application in Display Advertising*, Advertising.com, v.3 (Jan. 26, 2013), which is hereby incorporated by reference in its entirety. FrugalQuicksort takes advantage of a known interest in identifying and sorting only a small subset of data among a large set (e.g., the highest valued elements in the set of elements). By focusing only on a limited subset of data, the algorithm avoids unnecessary sorting, hence the prefix "Frugal," making it useful for application to extremely large data sets.

In accordance with certain embodiments, the FrugalQuicksort algorithm includes the following differences with respect to Quicksort: (1) an asymmetric and adaptive partitioning in the Divide step of the above-described Quicksort process to reduce unnecessary sorting, and (2) a mechanism terminating the sorting once a key subset of data has been identified.

Figure 1:
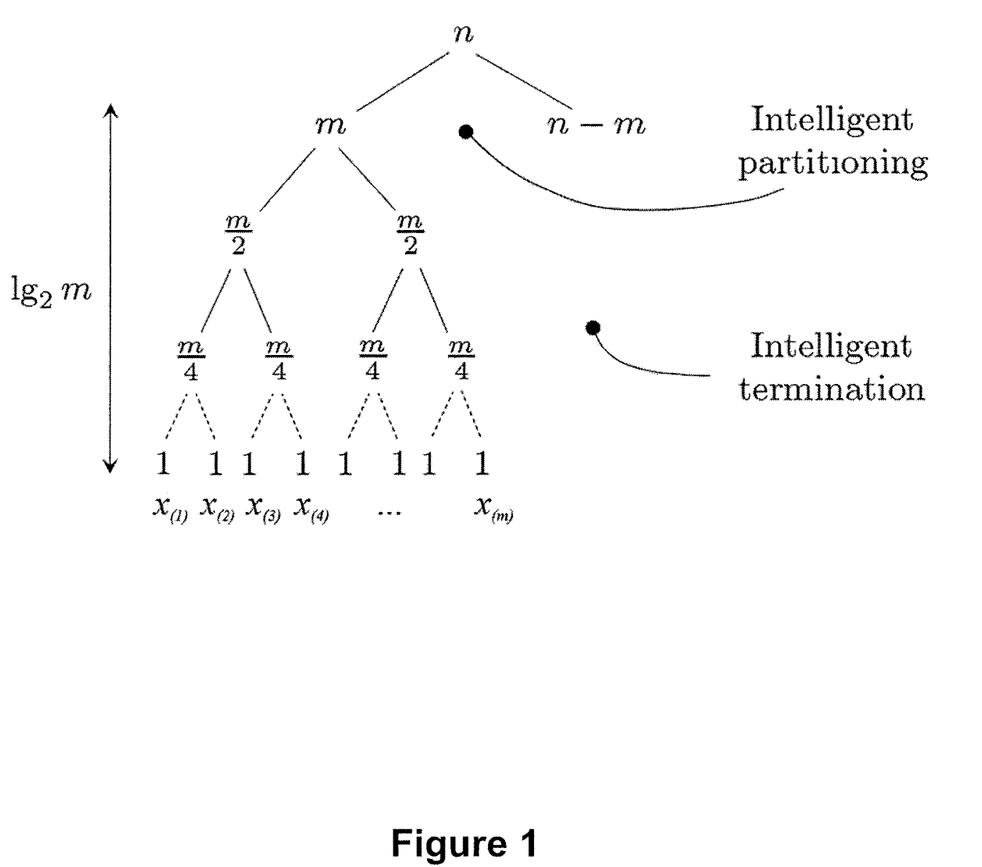
FIG. 1 is a recursion tree depicting the flow of an exemplary method for sorting elements, in accordance with an embodiment of the present disclosure.

FIG. 1 depicts a recursion tree for an example of a FrugalQuicksort, in accordance with an embodiment of the present disclosure. In particular, the recursion tree shown in FIG. 1 depicts an embodiment in which partitioning is perfect. As shown in FIG. 1, a data set may contain n elements. However, it may be necessary to sort fully only a subset of m elements for a given application. Accordingly, the n elements may be partitioned into two subsets: m and n−m.

Although, in practice, the value of m may not be known, if the list of n elements may be portioned into the m largest and n−m smallest values, then the n−m smaller values may be completely ignored, thus enabling computational resources to be invested in sorting the m largest values. In particular, with perfect partitioning and intelligent termination, the total number of key value swaps is $T(n)=T(m)+O(n)$, where $T(m)=2T(m/2)+O(m)$; i.e., $T(n)=O(m\ \lg_2 m)+O(n)=O(n+m\ \lg_2 m)$. Because the number of key value swaps using conventional Quicksort is $O(n\ \lg_2 n)$, it follows that whenever $m \ll n$ this can save a lot of computational processing.

The features of adaptive partitioning and intelligent termination may be further explained by reference to FIG. 1. At the top-level (first) partitioning in the recursion tree shown in FIG. 1, the task is to partition the complete set of elements, $\beta=\{i|i=1, \ldots, n\}$. In certain embodiments, the elements may represent bids. The rank of an element represents the descending order of its value relative to the values of other elements. For example, in embodiments where the elements correspond to bids, the rank of a bid represents the descending order of its bid price relative to the bid prices of other bids. Thus, an element has rank k in the element set $\beta$ if there are k−1 elements in $\beta$ with a higher price or other deemed value. The rank k element value may be referred to as $x_{(k)}$, and the rank of element i may be referred to as $y_i$.

If only the m highest ranked elements are needed for a given application with $m<n/2$, and the sorting is terminated once the top m elements are sorted, then the amount of unnecessary key value swaps is minimized by partitioning the elements such that elements with rank 1 through m end up in the first partition and elements with rank m+1 through n end up in the second partition. For example, in embodiments where the elements correspond to bids, if the m highest ranked bids are needed for the bid clearing process with m<n/2, and the sorting is terminated once the top m bidders are sorted, then the amount of unnecessary key value swaps is minimized by partitioning the bids such that bids with rank 1 through m end up in the first partition and bids with rank m+1 through n end up in the second partition. According to certain disclosed embodiments, the pivot point for the partitioning is denoted $\{i^*, x_{i^*}\}$. The pivot point is optimal if $i^*$ is the index of the element having rank m+1 and $x_i^*$ is the corresponding bid price or other element value (equivalently, $x_{i^*}=x_{(m+1)}$). Using the element with rank m+1 (rather than rank m) ensures that the m highest ranked elements end up in the same partition (the pivot point may in general end up in either of the two partitions).

As stated above, the value of m (i.e., the size of an appropriate candidate element set) may not be known in advance. To account for this, a sensible pivot point may be determined as a rank statistic of a carefully selected random sample of the element set. According to one embodiment, the sample size, s, may be calculated according to the following formula:

$$s = \begin{cases} \left\lfloor \frac{\gamma n}{m_{prior}} - 1 \right\rfloor_{[3, s_{max}]}, & \text{if } m_{prior} \text{ is given} \\ \left\lfloor \frac{\gamma n}{a_{cum}^-} - 1 \right\rfloor_{[3, s_{max}]}, & \text{otherwise} \end{cases}$$

in which n represents the total number of eligible elements, $a_{cum}^-$ represents the remaining element allocation to distribute (e.g., the remaining bid allocation), $m_{prior}$ represents an a priori known or estimated value of m (e.g., the remaining number of largest values to sort), $s_{max}$ represents the upper bound of samples used for pivot point selection, and $\gamma$ is a constant factor. In one embodiment, $\gamma$ may be computed according to the following formula:

$$\gamma = \begin{cases} \frac{2}{\eta}, & \text{if } m_{prior} \text{ is given} \\ \frac{2\theta_a \theta_{t_r}}{\gamma}, & \text{otherwise} \end{cases}$$

in which $\eta$ is a calibration parameter accounting for uncertainty in the a priori information and randomness of rank statistics, $m_{prior}$ represents an a priori known or estimated value of m (e.g., the remaining number of largest values to sort), $\theta_a$ represents the a priori element allocation ($0<\theta_a \leq 1$), and $\theta_t$ represents the a priori target allowability ($0<\theta_t \leq 1$).

In accordance with one embodiment, the pivot point may be the second highest element in the sample set (i.e., the rank 2 element). In other embodiments, another rank may be used to determine the pivot point for the sample set (e.g., rank 3, rank 4, etc.). Once the pivot point is selected, the selected element may be denoted as $i^*$ and its element value as $x^*$. Thus, the pivot point may be referred to as $\{i^*, x^*\}$. The expected value of the rank 2 element may be determined according to the following formula:

$$E(\tilde{Y}_{(2)}) = \frac{2n}{(s+1)},$$

in which n represents the total number of eligible elements and s represents the sample size, as may be determined by the formula discussed above.

As an example of applying the above-discussed methods for adaptive partitioning of elements to the market clearing aspect of an auction, one may consider a bid set containing n=50,000 bids. Assuming there is some reason to believe only approximately $m_{prior}$=5,000 highest bids need to be considered in order to identify the final bid set and the highest ineligible bid and given $\eta$=2 and $s_{max}$=20, the partitioning strategy then yields:

$$\gamma = \frac{2}{2} = 1$$

and $$s = \left\lfloor \frac{\gamma 50,000}{5,000} - 1 \right\rfloor_{[3,20]} = 9.$$

Accordingly, in this example, the first pivot point is selected as the second highest bid price from nine bids randomly selected (with replacement) from the original bid set.

The expected rank of the pivot point may also be determined for this exemplary bid set. In particular, given a sample size of s=9, with n=50,000 and j=2, the expected rank of the pivot point is:

$$E(\tilde{Y}_{(2)}) = \frac{2 \cdot 50,000}{(9+1)} = 10,000,$$

which is twice the value of $m_{prior}$ above. This is because the value of $\eta$ determines the factor by which the expected rank of the pivot is larger than $m_{prior}$.

Further, assuming that the first partitioning took place at the 10,000[th] largest bid in the original bid set, as set forth above, the next subarray to partition is then of size 10,000. Thus, continuing with the recursive partitioning algorithm will result in a next sub-array size of 3, as shown below:

$$s = \left\lfloor \frac{\gamma 10,000}{5,000} - 1 \right\rfloor_{[3,20]} = 3.$$

Hence, the second partitioning, in this example, is determined by the second largest value (here, the median) of three random samples from the 10,000 bid prices in the sub-array. Unless the initial partitioning in sub arrays of sizes 10,000 and 40,000 was so incorrect that the larger of these sub-arrays must be considered, most consecutive partitioning according to the adaptive partitioning algorithm will be based on the median of three randomly selected bids. This may potentially avoid a large amount of unnecessary swapping of bids. The associated cost of the reduction of swaps shown in this exemplary partitioning is the determination of s in each step, the random selection of 9 values in the first partitioning, and the determination of the second highest of these 9 random values.

The above-discussed methods for adaptive partitioning of elements may also be applied outside of bids in an auction environment or marketplace. For example, consider a set containing n=50,000 numbers and suppose one would like to identify the m=400 largest values in the set. Further, assume that η=2 and $s_{max}$=200 (note that the choice of these values is non-critical as long as η>1 and $s_{max}$≥3). In this example, because m is known, it follows that $m_{prior}$=m=400. The partitioning strategy thus yields:

$$\gamma = \frac{2}{2} = 1$$

and $$s = \left\lfloor \frac{\gamma 50,000}{400} - 1 \right\rfloor_{[3,200]} = 124.$$

Accordingly, the first pivot point is selected as the second highest number from 124 randomly selected (with replacement) numbers from the original set of numbers.

As with the previous example, the expected rank of the pivot point may also be determined for this exemplary set of numbers. In particular, given a sample size of s=124, with n=50,000 and j=2, the expected rank of the pivot point is:

$$E(\tilde{Y}_{(2)}) = \frac{2 \cdot 50,000}{(124+1)} = 800,$$

which is twice the value of $m_{prior}$ above.

Further, assuming that the first partitioning took place at the 800$^{th}$ largest bid in the original bid set, as set forth above, the next subarray to partition is then of size 800. Thus, continuing with the recursive partitioning algorithm will result in a next sub-array size of 3, as shown below:

$$s = \left\lfloor \frac{\gamma 800}{400} - 1 \right\rfloor_{[3,200]} = 3.$$

Hence, the second partitioning, in this example, is determined by the second largest value (here, the median) of three random samples from the 800 numbers in the subarray.

In addition to adaptive partitioning, embodiments of FrugalQuicksort may also differ from the conventional Quicksort algorithm by featuring intelligent termination. The conventional Quicksort algorithm may run until each element in a data set is sorted. For example, a set of elements may continue to be partitioned into smaller sub-sets of elements until all sub-sets contain only one element (i.e., each sub-set is a leaf). Embodiments of FrugalQuicksort avoid unnecessary sorting of elements by intelligently terminating the sorting process once a sufficient number of elements have been sorted.

According to one embodiment, in which the FrugalQuicksort algorithm is applied to the market clearing aspect of an auction, sorting of bids may proceed in descending order of bid price. Thus, intelligent termination may be performed by tracking the cumulative allocation of previously sorted eligible bids and detecting when the lowest eligible and highest ineligible bids have been identified. The cumulative bid allocation as of bid k reflects the sum of the bid allocations of the first through the k$^{th}$ ranked eligible bid. The lowest eligible bid value may be referred to as $x^{LE}$ and the highest ineligible bid value may be referred to as $x^{HI}$.

During the recursive partitioning process, bids are identified in descending order of bid price (i.e., from highest to lowest bid price), as the leaves in the recursion tree are reached. In other words, each time a leaf is reached, that leaf may be denoted as the bid having the next highest bid price or rank. The bid may be analyzed to determine whether the bid is eligible for the impression (i.e., whether its bid target or target allowability is one). If the bid is eligible, then the cumulative allocation, $a_{cum}$(k) is incremented by the bid allocation corresponding to that bid. Next, if $a_{cum}$(k) now exceeds one, then the bidder is a candidate for being the lowest eligible or highest ineligible bidder. If $x^{LE}$ is undefined, then it is set to $x_{(k)}$. If it is already set, but $x^{HI}$ is undefined and $x_{(k)} < x^{LE}$, then $x^{HI}$ is set to $x_{(k)}$. By keeping track of this information, it is possible to determine, after each data element has been ranked, whether additional sorting of bids is needed.

Although certain embodiments of intelligent termination are described herein by reference to the market clearing aspect of an auction, one of ordinary skill in the art will appreciate that the disclosed techniques for intelligent termination may be applied outside of the context, such as to normal/simple sorting of numbers. For example, the top m values in a set of n values may be sorted using the above-described adaptive partitioning algorithm. If the number of elements that remain to be sorted is tracked, the sorting may be terminated once no more elements remain. In other words, if no target allowability or allocation is involved, the value of $m_{prior}$ may be reduced by 1 each time a leaf is reached, and the sorting may be terminated when $m_{prior}$ reaches 0.

Figure 2:
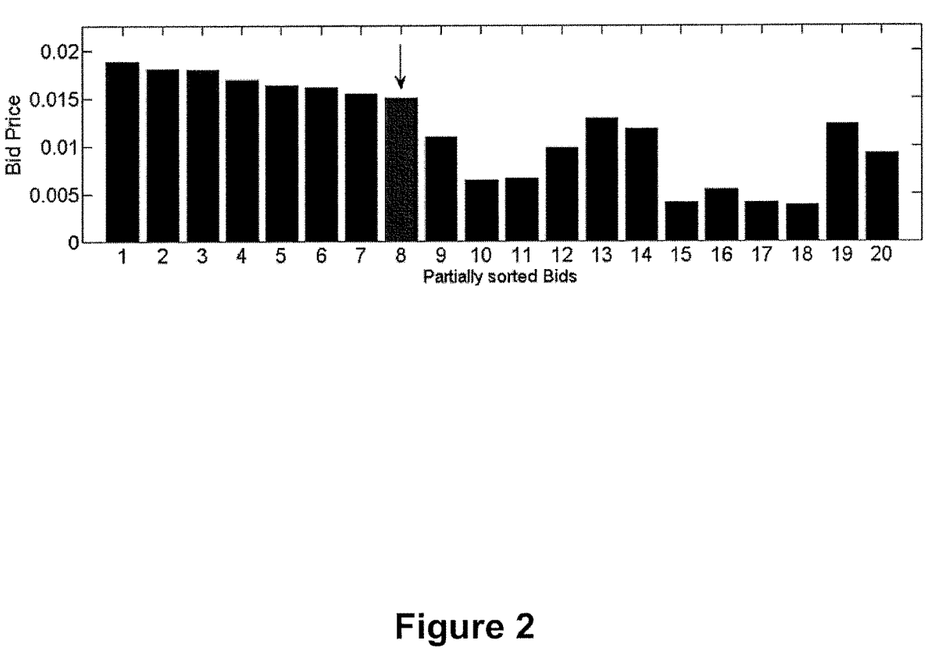
FIG. 2 is a bar chart representing bid values of an exemplary set of partially sorted bids, in accordance with an embodiment of the present disclosure.

FIG. 2 depicts an exemplary bar chart representing a set of partially sorted bids, in accordance with an embodiment of the present disclosure. As shown in FIG. 2, bids may be sorted based on bid price, from highest bid price to lowest bid price. For example, FIG. 2 depicts a scenario in which the eight highest ranking (i.e., highest value) bids have been sorted. Although bids 9 through 20 have not yet been sorted, each has a bid price lower than any of the bid prices corresponding to bids 1 through 8. The bar corresponding to the bid price of bid 8 is highlighted in FIG. 2 to represent that it is the bid currently under analysis. Thus, at this point, the cumulative bid allocation (i.e., $a_{cum}$(8)) is equal to the sum of all bid allocations corresponding to bids 1 through 8. As discussed above, if the addition of the bid price corresponding to bid 8 (i.e., $a_8$) to the previous cumulative bid allocation (i.e., $a_{cum}$(7)) causes the cumulative bid allocation to exceed a value of one, then bid 8 may be a candidate for lowest eligible or highest ineligible bid. Specifically, if the lowest eligible bid price (i.e., $x^{LE}$) is currently undefined, then it is set to the bid price of bid 8 (i.e., $x_8$). If the lowest eligible bid price is already set, but the highest ineligible bid price (i.e., $x^{HI}$) is undefined and the bid price of bid 8 is less than the lowest eligible bid price (i.e., $x_8 < x^{LE}$), then the highest ineligible bid price is set to the bid price of bid 8.

Figure 3:
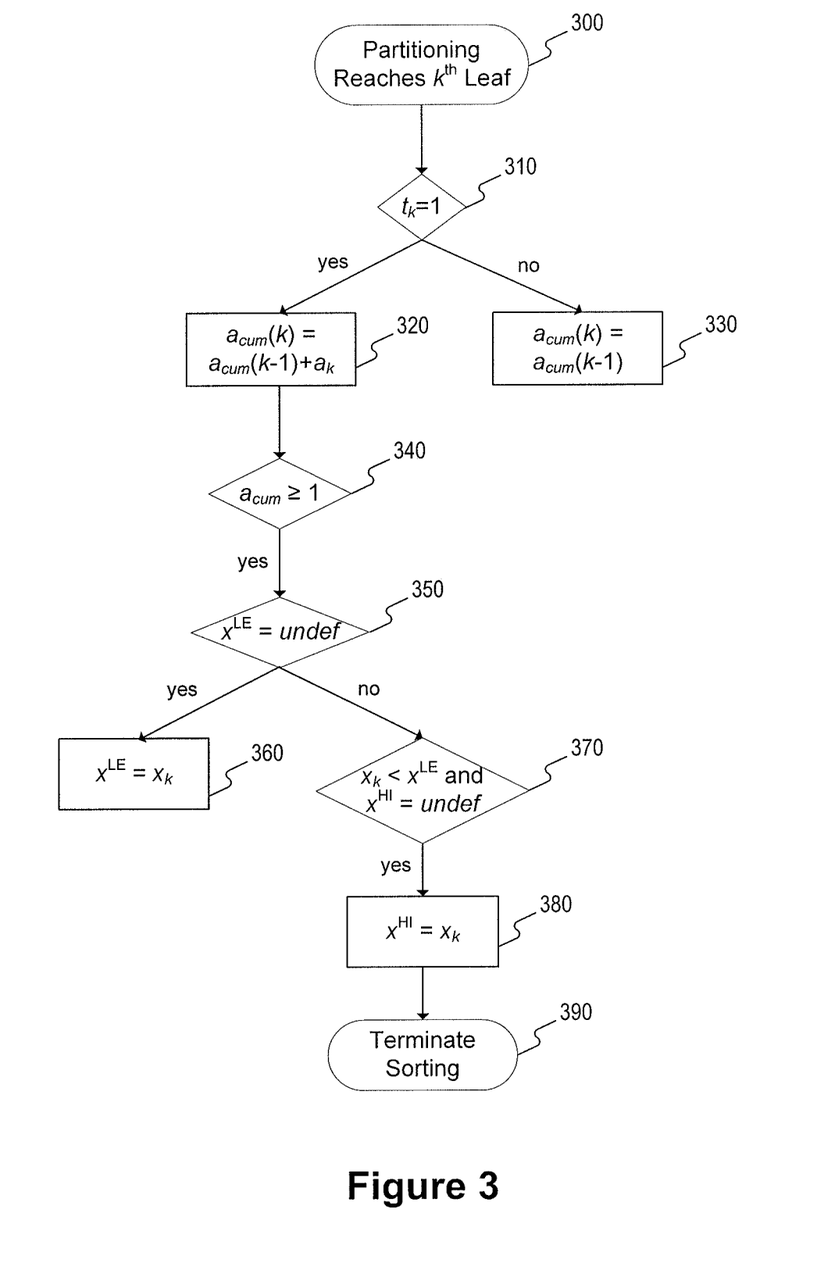
FIG. 3 is a flow diagram depicting an exemplary method for intelligently terminating the sorting of elements, in accordance with an embodiment of the present disclosure.

FIG. 3 is an exemplary flow chart depicting an exemplary method for intelligently termination sorting of bids, in accordance with an embodiment of the present disclosure. The flow demonstrated in FIG. 3 begins at step 300 when the adaptive partitioning process described herein reaches the k$^{th}$ leaf. At this time, the bid currently under analysis is the rank k bid, with bid price $x_k$, bid allocation $a_k$, and target allowability $t_k$. The objective of the flow depicted in FIG. 3 is to determine whether the necessary number of bids have been sorted and, thus, the sorting may terminate. In FIG. 3, $x^{LE}$ denotes the lowest eligible bid price, and $x^{HI}$ denotes the highest ineligible bid price.

After reaching the k$^{th}$ leaf, the target allowability of the k$^{th}$ bid is analyzed at step 310. If the target allowability is 1

($t_k$=1), then the bid allocation of the $k^{th}$ bid is added to the cumulative bid allocation at step 320 ($a_{cum}(k)=a_{cum}(k-1)+a_k$). Otherwise, if the target allowability is 0, then the bid allocation of the $k^{th}$ bid is not added to the cumulative bid allocation, but rather the cumulative bid allocation remains unchanged ($a_{cum}(k)=a_{cum}(k-1)$), as shown in step 330. When the target allowability is 1 and the cumulative bid allocation has been updated to reflect the value of the bid allocation of the $k^{th}$ bid, the updated cumulative bid allocation is analyzed to determine whether it is greater than or equal to 1 at step 340. If the updated cumulative bid allocation is greater than or equal to 1, then it is next determined whether the lowest eligible bid price has been defined at step 350. If the lowest eligible bid price is undefined, then it is set to the bid price of bid k at step 360. Otherwise, step 370 evaluates whether the bid price of bid k is less than a previously defined lowest eligible bid price and whether the highest ineligible bid price has not been defined. If both of these conditions are true, then the highest ineligible bid price is set to the bid price of bid k at step 380. Because the lowest eligible bid price and highest ineligible bid price have been determined as of step 380, sorting or bids may terminate at step 390.

Figure 4:
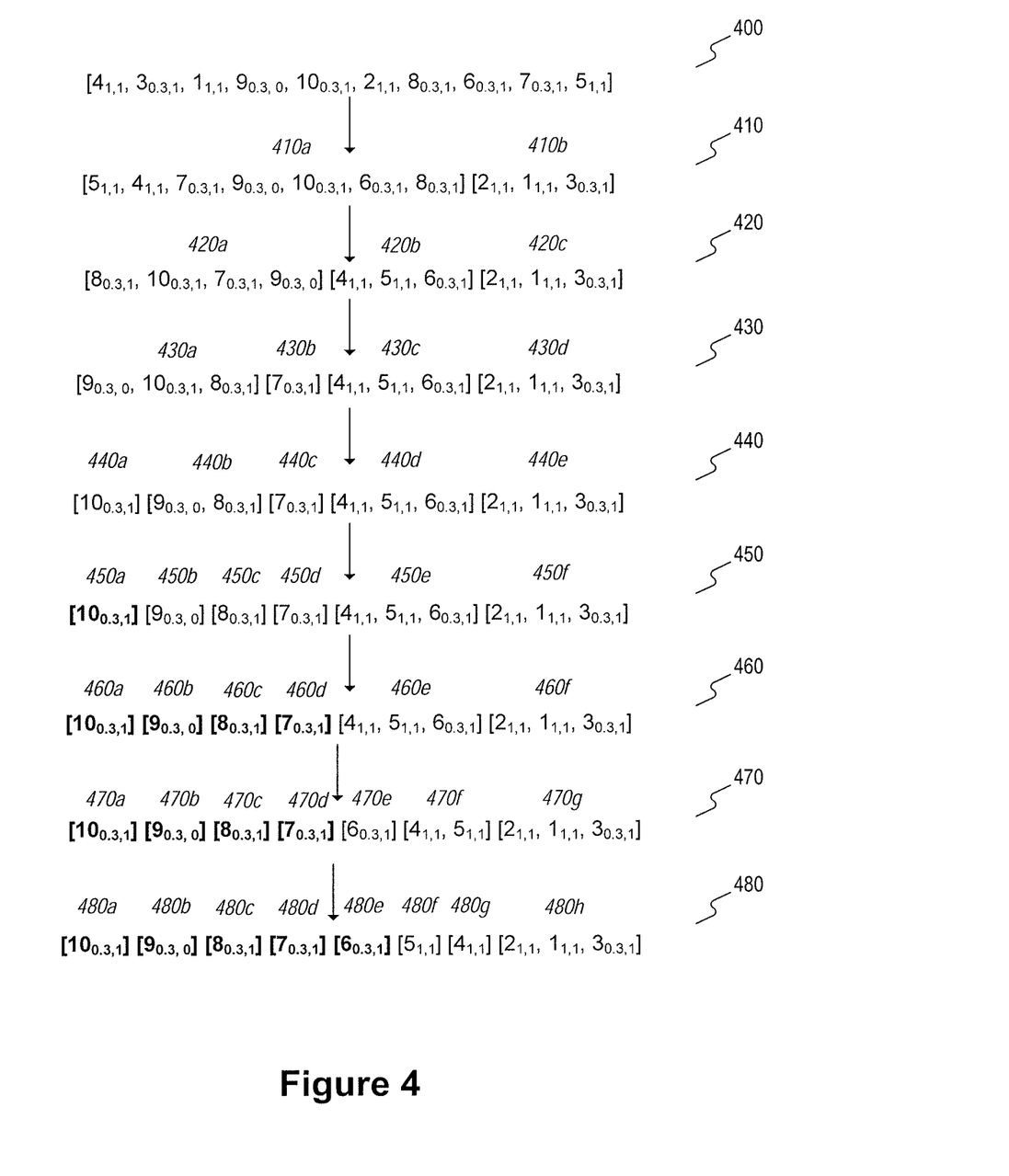
FIG. 4 is a flow diagram depicting an exemplary partitioning of bids into bid subsets and intelligent termination of sorting, in accordance an embodiment of the present disclosure.

FIG. 4 depicts a flow of an exemplary partitioning of bids including intelligent termination of sorting, in accordance with an embodiment of the present disclosure. In particular, FIG. 4 depicts a set of ten bids, each being associated with a bid price, bid allocation, and target allowability. In FIG. 4, each bid is represented by the notation $p_{a,t}$, where p denotes the bid price, a the bid allocation, and t the target allowability. For example, the first bid in the initial bid step depicted at 400 has a bid price of 4, a bid allocation of 1, and a target allowability of 1.

The exemplary flow depicted in FIG. 4 begins by applying standard Quicksort partitioning to the initial bid set 400. Thus, bid set 400 is divided into two subsets by first selecting a pivot and then swapping the values in the original set around the pivot until there is no overlap in the range of values between the two subsets. In FIG. 4, the selected pivot is 3. It will be understood, however, that another pivot may be chosen based, for example, on adaptive partitioning, in accordance with embodiments described in further detail above. As shown in FIG. 4, the initial partitioning around the pivot 3 will result in 2 subsets: one consisting of bid prices 5, 4, 7, 9, 10, 6, and 8 (410a); and the other consisting of bid prices 2, 1, and 3 (410b). Each of the bids in the initial bid set 400 larger than the pivot 3 are in the first subset 410a, while each bid with a bid price of 3 or lower is in second subset 410b.

As the recursive Quicksort partitioning continues, subset 410a is partitioned around a pivot of 6 into subsets 420a and 420b. Then, subset 420a is partitioned around a pivot of 7 into subsets 430a and 430b. Next, the first of these subsets, 430a, is further partitioned around a pivot of 9, which results in the set of arrays shown at 440. At this point, the next subset to consider for partitioning is 440a, which has only one element ($10_{0.3, 1}$). Thus, the recursive Quicksort partitioning has reached the first leaf in the sorting tree, so the intelligent termination analysis may begin with this element. First, the target allowability of this bid is considered to determine whether the bid is eligible or ineligible for inclusion in the final bid set. Here, the target allowability of bid 440a is 1, so this is an eligible bidder whose bid allocation may contribute to the cumulative allocation of the final bid set. As this is the first leaf in the sorting tree, the cumulative bid allocation ($a_{cum}$) is equal to the bid allocation of this bid, 0.3. This value is less than 1, so partitioning must continue until, as the lowest eligible and highest ineligible bid have not been found.

The next recursive Quicksort partitioning sorts subset 440b about a pivot of 9, resulting in the set shown in 450, including subsets 450b and 450c. The bid represented by 450a is bolded in FIG. 4 to indicate that it is in its final position and will not be examined again in further partitioning or intelligent termination analysis. Thus, the next subset for consideration is subset 450b, which has only one element, thus making it appropriate for consideration in the intelligent termination analysis. However, the target allowability for the bid in subset 450b is zero, so this bid is not eligible for inclusion in the final bid set. Accordingly, the cumulative bid allocation remains at 0.3 ($a_{cum}(2)=a_{cum}(1)=0.3$).

The sorting continues to the next subset, 450c, which also has only one element, making it the third leaf in the sorting tree. The bid in subset 450c has a target allowability of 1, which makes it an eligible bidder. The cumulative allocation is updated by adding the allocation of this bid (0.3) to the previous cumulative bid allocation (0.3) to reach a new cumulative bid allocation of 0.6. This value is still less than 1, so the lowest eligible and highest ineligible bid are still undefined.

Sorting proceeds again to the next subset, 450d, which also contains only one element, making it the fourth leaf. This leaf represents a bid with a target allowability of 1 and a bid allocation of 0.3. Thus, the cumulative bid allocation (0.6) is updated to include this bid allocation (0.3), making the new cumulative bid allocation 0.9, which is less than 1. The current state of sorting is shown in FIG. 4 at 460, in which subsets 460a, 460b, 460c, and 460d are bolded to indicate that the bids in each of these subsets have already been sorted and, thus, need no further analysis.

The next subset in FIG. 4 (460e), however, does not contain only one element, but rather contains three bids. Accordingly, subset 460e is partitioned. If a pivot of 5 is selected, the next set of arrays will be those shown in FIG. 4 at 470. The next subset for consideration in 470 (470e) contains only one element, making it the fifth leaf in the sorting tree. This leaf corresponds to a bid having a target allowability of 1 and a bid allocation of 0.3. Because this is an eligible bid, the cumulative bid allocation (0.9) is updated to reflect the bid allocation of the fifth leaf (0.3), making the new cumulative bid allocation 1.2. As this is the first time the cumulative bid allocation has exceeded 1, the bid represented by the fifth leaf must represent the lowest eligible bid ($x^{LE}=6$).

The recursive Quicksort partitioning continues to the next subset 480e, which contains two elements. The results of partitioning this subset about a pivot of 4 are shown at 480. Here, the next subset contains one element, which makes this sub-array the sixth leaf. The corresponding target allowability is 1, making this an eligible bid. Further, the associated bid price to this leaf is 5, which is lower than the lowest eligible bid price. Thus, this bid must be the highest ineligible bid ($x^{HI}=5$). As the highest eligible bid has now been defined, early termination is possible and no more sorting is needed.

Figure 5:
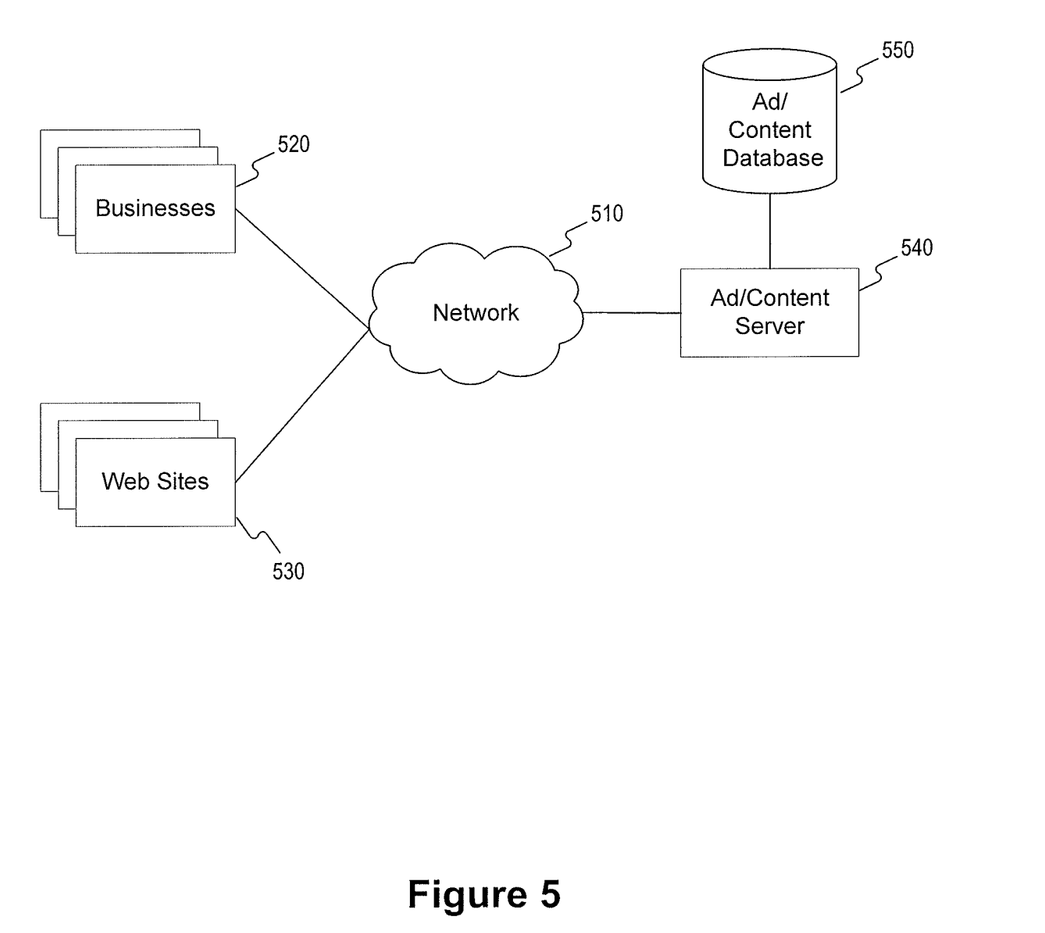
FIG. 5 is a diagram of an exemplary system environment for implementing embodiments of the present disclosure.

FIG. 5 depicts an exemplary system environment for implementing embodiments of the present disclosure. As shown in FIG. 5, a bidding mechanism may involve several components, such as businesses 520, web sites 530, and ad/content server 540. Each of these components may communicate with one another over a network 510, such as the Internet. For example, businesses 520 may send one or more advertisements to ad/content server 540, such that ad/content server 540 may distribute the advertisements to web sites 530 for viewing by users. Along with each advertisement, businesses 520 may also submit to ad/content server 540 one or more bids for an impression displaying the advertisement. As discussed in further detail herein, each bid submitted by businesses 520 may include a bid price, a bid allocation, and a bid target. Ad/content server 540 may also communicate with web sites 530 over network 510. For example, web sites 530 may submit information regarding ad impression availability to ad/content server 540, and ad/content server 540 may reply to web sites 530 with an ad selected according to the processes described herein (e.g., in connection with FIG. 6).

The ad/content server 540 may receive information from businesses 520 (e.g., advertisements and bids) and web sites 530 (e.g., ad impression availability) and store the information in an ad/content database 550. Once ad/content server 540 has received all bids for an impression, ad/content server 540 may analyze and sort the bids to determine a winning bid, in accordance with embodiments disclosed herein. Upon determining a winning bid, ad/content server 540 may forward the advertisement corresponding to the winning bid over network 510 to web sites 530 for display to users.

In addition to the components depicted in FIG. 5 and described above, other components may be provided for implementing the disclosed embodiments, as FIG. 5 is provided for illustration purposes only. These additional components may include, for example, additional servers or server clusters. Further, these and other components may be utilized to store and process the bids, advertisements, and impression requests disclosed herein, as well as additional types of bids, advertisements, and impression requests. Moreover, while described in the context of online advertising, FIG. 5 may also be adapted for other system environments and uses. For example, the components of FIG. 5 may also be utilized for processing bids in an auction marketplace outside of the advertising space, including for bids related to goods, services, or financial instruments (stocks, bonds, contracts, obligations, securities, and the like).

Figure 6:
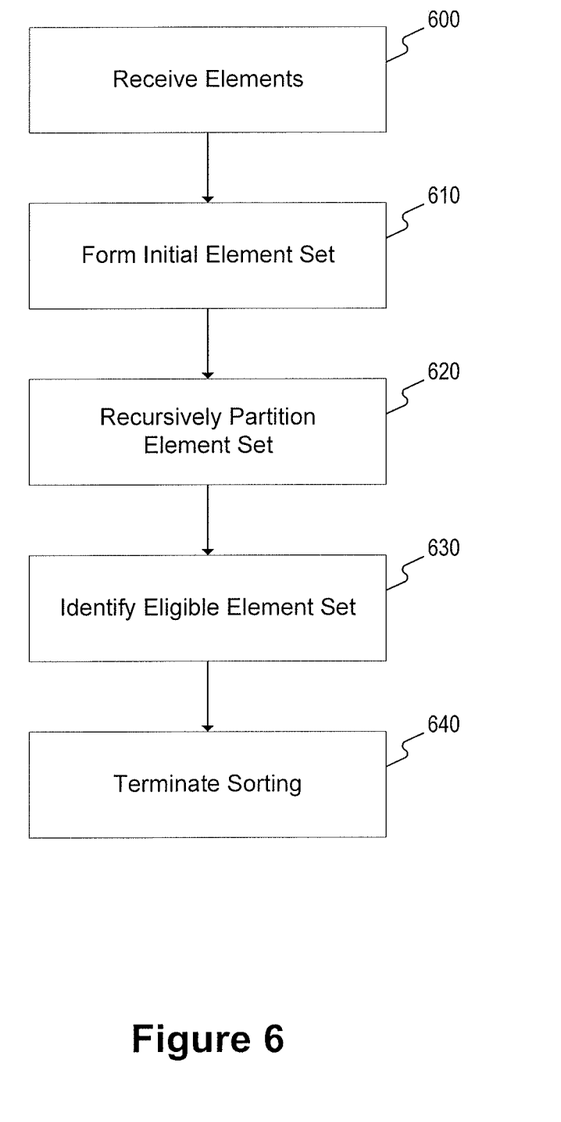
FIG. 6 is a flow diagram depicting an exemplary method for sorting elements, in accordance with an embodiment of the present disclosure.

FIG. 6 is an exemplary flow chart illustrating exemplary steps of a method for sorting elements, in accordance with an embodiment of the present disclosure. As shown in FIG. 6, a plurality of elements may be received for sorting at step 600. For example, a plurality of bids may be received over a network, such as network 510, from a plurality of interested bidders. In one embodiment, the received bids may be requests by businesses to display an advertisement to a user through a web page, such as a page on web sites 530. In other words, the bids may be for ad impressions. In this embodiment, the plurality of interested bidders may include, for example, businesses 520 who wish to advertise their products or services to Internet users. Each bid may include a bid price, a bid allocation, and a bid target, as discussed in more detail above. Once bids have been received from all interested bidders, the bids may be compiled at the ad/content server 540 and/or ad/content database 550 to form an initial element set at step 610.

The initial element set may be recursively partitioned into a plurality of element subsets at step 620. For example, in the first stage of recursive partitioning, the initial element set may be partitioned about a pivot into two subsets. According to certain embodiments relating to market clearing, the partitioning may be performed by ad/content server 540 using bid data stored on ad/content database 550. Due to the recursive nature of the partitioning, each of these subsets may be further partitioned until a point at which a sufficient number of elements have been sorted and identified as eligible elements, such as in step 630. In accordance with one embodiment, in each recursion, a pivot may be selected from a random sample of elements taken from an element set (or subset). For example, as discussed above, s independent, uniform, and random samples may be drawn from an element set to find one element in the sample with the second highest element value to be used as a pivot point. Accordingly, all elements in the original element set with element values larger than the second highest element value in the sample set may go into one partition, and all elements in the element set with element values smaller than (or equal to) the second highest element value may go into a second partition.

The next step in the exemplary element sorting process depicted in FIG. 6 is to identify a set of eligible elements, as shown in step 630. In accordance with one embodiment, the set of eligible elements may comprise all highest priced elements with a target allowability of 1 and whose cumulative element allocation is no greater than 1. As discussed above, the eligible element set may be determined to be a final element set when a lowest eligible element and highest ineligible element have been found. For example, as leaves in the sorting tree are identified (in order or descending value), leaf elements with a target allowability of 1 may be added to the eligible element set, so long as the addition of their element allocation to the previous cumulative element allocation does not push the cumulative element allocation above 1. Once the cumulative element allocation exceeds one, the lowest eligible element and highest ineligible element may be identified. As soon as these element are identified, the recursive partitioning of elements may terminate at step 640.

In accordance with certain embodiments, in which the disclosed method for sorting elements is applied to bids in the market clearing aspect of an auction, when a set of eligible bids has been identified and partitioning is terminated in step 640, a winning bid may be selected from the set of eligible bids. In one embodiment, each bid in the set of eligible bids may be associated with a numerical range between 0 and 1, according to its bid allocation. Thus, if bids A, B, and C are associated with bid allocations 0.2, 0.5, and 0.3, respectively, they may be associated with the following numerical ranges: A [0.0, 0.2], B (0.2, 0.7], C (0.7-1.0]. A random number between 0 and 1 may then be generated to facilitate selection of the winning bid. For example, if the randomly generated value is 0.61, then B may be the winning bid. Accordingly, a business that submitted bid B may be awarded an impression and that business' advertisement may be displayed in a placeholder for advertisements on a given web page.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

Therefore, it is intended that the disclosed embodiments and examples be considered as exemplary only, with a true scope of the present disclosure being indicated by the following claims and their equivalents.

What is claimed is:

1. A computer-implemented method for sorting electronic bids, comprising:
   receiving, by a server processor from a computing device corresponding to an electronic announcement creator, one or more electronic bids over a network, wherein each of the one or more electronic bids relates to a request to display an electronic announcement on a web page and includes an electronic bid price and an electronic bid allocation, the electronic bid allocation being a weighting factor for affecting the likelihood of an electronic bid being selected as a winning electronic bid;
   generating, by the server processor, an electronic bid set including the one or more electronic bids;
   recursively partitioning, using the server processor, the electronic bid set into one or more electronic bid subsets;
   tracking, using the server processor, the recursively partitioned electronic bid sets to identify a set of eligible electronic bids from the electronic bid set, wherein identifying the set of eligible electronic bids comprises identifying a set of highest priced electronic bids whose cumulative bid allocation does not exceed a value of one; and
   automatically terminating, using the server processor, the recursive partitioning of electronic bids once the set of eligible electronic bids is identified.

2. The computer-implemented method of claim 1, wherein each of the one or more electronic bids includes an electronic bid price, a bid allocation, and an electronic bid target.

3. The computer-implemented method of claim 1, for identifying a set of highest priced electronic bids, comprising:
   indexing the electronic bid set in an array on a server of the server processor.

4. The computer-implemented method of claim 1, for identifying a set of highest priced electronic bids, comprising:
   identifying electronic bids in a descending order according to price after the electronic bid set is recursively partitioned; and
   determining whether the electronic bid is eligible for an impression.

5. The computer-implemented method of claim 1, wherein identifying the set of eligible electronic bids further comprises identifying a lowest eligible electronic bid and a highest ineligible electronic bid from the one or more electronic bids in the electronic bid set.

6. A system for sorting electronic bids, comprising:
   a data storage device storing instructions for sorting electronic bids; and
   one or more processors configured to execute the instructions to perform a method comprising:
   receiving, by a server processor from a computing device corresponding to an electronic announcement creator, one or more electronic bids over a network, wherein each of the one or more electronic bids relates to a request to display an electronic announcement on a web page and includes an electronic bid price and an electronic bid allocation, the electronic bid allocation being a weighting factor for affecting the likelihood of an electronic bid being selected as a winning electronic bid;
   generating, by the server processor, an electronic bid set including the one or more electronic bids;
   recursively partitioning, using the server processor, the electronic bid set into one or more electronic bid subsets;
   tracking, using the server processor, the recursively partitioned electronic bid sets to identify a set of eligible electronic bids from the electronic bid set, wherein identifying the set of eligible electronic bids comprises identifying a set of highest priced electronic bids whose cumulative bid allocation does not exceed a value of one; and
   automatically terminating, using the server processor, the recursive partitioning of electronic bids once the set of eligible electronic bids is identified.

7. The system of claim 6, wherein each of the one or more electronic bids includes an electronic bid price, a bid allocation, and an electronic bid target.

8. The system of claim 6, for identifying a set of highest priced electronic bids, comprising:
   indexing the electronic bid set in an array on a server of the server processor.

9. The system of claim 6, for identifying a set of highest priced electronic bids, comprising:
   identifying electronic bids in a descending order according to price after the electronic bid set is recursively partitioned; and
   determining whether the electronic bid is eligible for an impression.

10. The system of claim 6, wherein identifying the set of eligible electronic bids further comprises identifying a lowest eligible electronic bid and a highest ineligible electronic bid from the one or more electronic bids in the electronic bid set.

11. A non-transitory computer readable medium including instructions for providing electronic content comprising an electronic announcement stored in a database to a web server by sorting electronic bids to display the electronic content on a web page which, when executed by a server processor, causes the server processor to perform steps comprising:
   receiving, by a server processor from a computing device corresponding to an electronic announcement creator, one or more electronic bids over a network, wherein each of the one or more electronic bids relates to a request to display an electronic announcement on a web page and includes an electronic bid price and an electronic bid allocation, the electronic bid allocation being a weighting factor for affecting the likelihood of an electronic bid being selected as a winning electronic bid;
   generating, by the server processor, an electronic bid set including the one or more electronic bids;
   recursively partitioning, using the server processor, the electronic bid set into one or more electronic bid subsets;
   tracking, using the server processor, the recursively partitioned electronic bid sets to identify a set of eligible electronic bids from the electronic bid set, wherein identifying the set of eligible electronic bids comprises identifying a set of highest priced electronic bids whose cumulative bid allocation does not exceed a value of one; and automatically terminating, using the server processor, the recursive partitioning of electronic bids once the set of eligible electronic bids is identified.

12. The non-transitory computer readable medium of claim 11, wherein each of the one or more bids includes an electronic bid price, a bid allocation, and an electronic bid target.

13. The non-transitory computer readable medium of claim 11, for identifying a set of highest priced electronic bids, comprising:
   indexing the electronic bid set in an array on a server of the server processor.

14. The non-transitory computer readable medium of claim 11, for identifying a set of highest priced electronic bids, comprising:
   identifying electronic bids in a descending order according to price after the electronic bid set is recursively partitioned; and
   determining whether the electronic bid is eligible for an impression.

* * * * *